United States Patent
Jacobs et al.

(10) Patent No.: US 10,294,070 B2
(45) Date of Patent: May 21, 2019

(54) REGENERATIVE ELECTRICAL POWER SUPPLY FOR ELEVATORS

(71) Applicant: Premco, Inc., New Rochelle, NY (US)

(72) Inventors: Harold L. Jacobs, Scarsdale, NY (US);
Lewis M. Kwit, New York, NY (US);
Kevin P. Lynch, Glen Oaks, NY (US)

(73) Assignee: Premco, Inc., New Rochelle, NY (US)

( * ) Notice: Subject to any disclaimer, the term of this patent is extended or adjusted under 35 U.S.C. 154(b) by 0 days.

(21) Appl. No.: 15/355,363

(22) Filed: Nov. 18, 2016

(65) Prior Publication Data
US 2017/0137259 A1 May 18, 2017

Related U.S. Application Data

(60) Provisional application No. 62/256,999, filed on Nov. 18, 2015.

(51) Int. Cl.
*B66B 5/00* (2006.01)
*B66B 1/30* (2006.01)

(52) U.S. Cl.
CPC .............. *B66B 1/302* (2013.01); *B66B 1/308* (2013.01); *Y02B 50/142* (2013.01)

(58) Field of Classification Search
CPC ......... B66B 5/021; B66B 1/302; B66B 1/306; B66B 1/308
USPC ........................................................ 187/290
See application file for complete search history.

(56) References Cited

U.S. PATENT DOCUMENTS

| | | | | |
|---|---|---|---|---|
| 4,279,563 A | * | 7/1981 | Miller | B66B 11/006 191/2 |
| 4,533,021 A | * | 8/1985 | Perez de la Orden | B66B 5/027 187/290 |
| 4,657,117 A | * | 4/1987 | Lauer | B66B 5/027 187/289 |
| 4,741,415 A | * | 5/1988 | Nomura | B66B 1/308 187/296 |
| 5,601,156 A | * | 2/1997 | McCarthy | B66B 9/00 187/249 |
| 5,703,791 A | * | 12/1997 | Amano | H02J 3/24 322/20 |
| 5,712,456 A | * | 1/1998 | McCarthy | B66B 1/28 187/289 |
| 5,732,795 A | * | 3/1998 | McCarthy | B66B 1/34 187/250 |
| 5,909,017 A | * | 6/1999 | Born | B66B 1/30 187/290 |
| 6,311,801 B1 | * | 11/2001 | Takagi | B66B 1/32 187/288 |
| 7,165,654 B2 | * | 1/2007 | Takehara | B66B 1/30 187/290 |
| 7,246,686 B2 | | 7/2007 | Smith et al. | |
| 8,172,042 B2 | | 5/2012 | Wesson et al. | |
| 8,230,978 B2 | | 7/2012 | Agirman et al. | |

(Continued)

*Primary Examiner* — David S Warren
(74) *Attorney, Agent, or Firm* — Faegre Baker Daniels LLP

(57) ABSTRACT

An energy storage system is provided including: an elevator; an elevator motor; a power system coupled to the elevator motor. The power system including at least one capacitor operable to store energy received form the elevator motor and to supply stored energy to the elevator motor; and at least one flywheel operable to store energy received from the elevator motor and to supply stored energy to the elevator motor.

14 Claims, 3 Drawing Sheets

(56) References Cited

U.S. PATENT DOCUMENTS

| | | | |
|---|---|---|---|
| 2005/0173197 A1* | 8/2005 | Takehara | B66B 1/30 187/277 |
| 2008/0048497 A1* | 2/2008 | Donnelly | B66C 13/18 307/19 |
| 2008/0283341 A1* | 11/2008 | Aulanko | B66B 1/308 187/289 |
| 2009/0284079 A1* | 11/2009 | Jahkonen | B66B 1/30 307/82 |
| 2011/0100760 A1* | 5/2011 | Acquaviva | B66B 1/302 187/290 |
| 2011/0120811 A1* | 5/2011 | Kallioniemi | B66B 1/2458 187/382 |
| 2011/0139547 A1* | 6/2011 | Veronesi | B66B 1/302 187/247 |
| 2011/0144810 A1* | 6/2011 | Wesson | B66B 1/302 700/275 |
| 2011/0147130 A1* | 6/2011 | Oggianu | B66B 1/302 187/290 |
| 2011/0208360 A1* | 8/2011 | Oggianu | B66B 1/302 700/275 |
| 2011/0247900 A1* | 10/2011 | Blasko | B66B 1/302 187/247 |
| 2013/0075199 A1* | 3/2013 | Kauppinen | B66B 1/30 187/247 |
| 2013/0133987 A1* | 5/2013 | Manfredi | B66B 1/30 187/393 |
| 2013/0264875 A1 | 10/2013 | Kaminsky et al. | |
| 2014/0076666 A1 | 3/2014 | Yen et al. | |
| 2014/0166407 A1* | 6/2014 | Sonnenmoser | B66B 1/2408 187/276 |
| 2014/0203565 A1* | 7/2014 | Mazur | F03D 3/0418 290/55 |
| 2014/0364272 A1* | 12/2014 | Shapira | B60W 10/08 477/3 |
| 2015/0353321 A1* | 12/2015 | Fargo | B66B 1/285 187/276 |
| 2016/0145075 A1* | 5/2016 | Hanninen | B66B 1/34 187/289 |
| 2017/0137259 A1* | 5/2017 | Jacobs | B66B 5/021 |

\* cited by examiner

REGENERATIVE ELECTRICAL POWER SUPPLY FOR ELEVATORS

PRIORITY

The present application is a non-provisional application that claims priority to U.S. Provisional Application No. 62/256,999, titled REGENERATIVE ELECTRICAL POWER SUPPLY FOR ELEVATORS, filed on Nov. 18, 2015, the disclosure of which is hereby expressly incorporated by reference.

FIELD OF THE DISCLOSURE

The present disclosure is related to methods and devices for harvesting energy from and providing energy to elevators.

BACKGROUND AND SUMMARY

Elevators perform work by raising and lowering mass between floors of buildings. Some movement of the elevator requires energy to be input to the system to achieve the movement of the mass. Other movement of the elevator involves providing a controlled descent of mass.

According to on embodiment, an energy storage system is provided including: an elevator; an elevator motor; a power system coupled to the elevator motor. The power system including at least one capacitor operable to store energy received form the elevator motor and to supply stored energy to the elevator motor; and at least one flywheel operable to store energy received from the elevator motor and to supply stored energy to the elevator motor.

According to another embodiment of the present disclosure, a method of operating an elevator is provided including: providing a power system coupled to an elevator motor operable to move an elevator having an elevator car and elevator doors; the power system including at least one capacitor and at least one flywheel; and operating the at least one capacitor and the flywheel to store energy received from the elevator motor and to supply stored energy to the elevator motor.

DETAILED DESCRIPTION OF EMBODIMENTS

Figure 1:
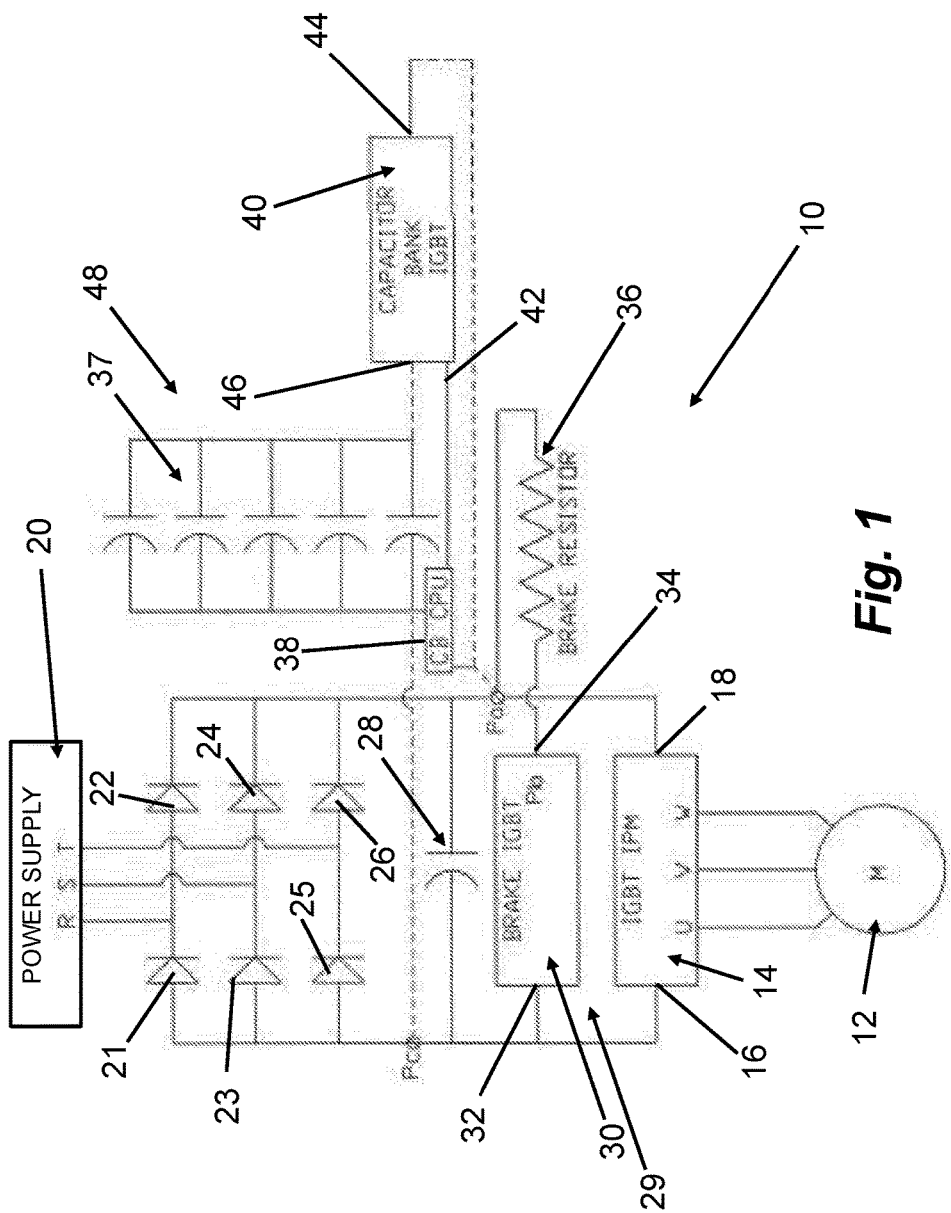
FIG. 1 is a diagram showing elements of a system for harvesting energy from an elevator, storing the energy, and for supplying the harvested energy back to the elevator or otherwise.

FIG. 1 shows an exemplary system 10 for harvesting, storing, and supplying energy to an elevator.

System 10 includes AC motor 12, power module 14, power supply 20, bridge rectifier (21-26), brake 29, and capacitor bank 37.

AC motor 12 is used to drive an elevator. Motor 12 is illustratively a Variable Frequency Drive (VFD) motor. Power module 14 is illustratively an Insulated Gate Bipolar Transistor (IGBT) intelligent power module. Power module 14 is coupled to a positive DC bus at connection 16 and to a negative DC bus at connection 18. Power supply 20 is illustratively a Three-phase AC incoming line. The bridge rectifier is a three-phase, six-pulse bridge rectifier that includes six diodes (21-26). Brake 29 includes a chopper IGBT 30 and a brake resistor 36. IGBT 30 is coupled to the positive DC bus at connection 32 and is coupled to the negative DC bus via the resistor 36 and connection 34. Capacitor bank 37 includes capacitor bank CPU 38, Capacitor Bank IGBT 40, DC Bus conductor connection 42, DC Bus conductor connection 44, capacitor bank IGBT output connection 46 and extended DC Bus Link Capacitor Bank 48. DC Bus conductor connection 42 provides voltage sensing.

In operation, system 10 provides DC Bus capacitor expansion for Variable Frequency Drives (VFD's). DC Bus current is illustratively calculated from the drive maximum output current value. The actual DC bus current is approximately the motor current time the square root of 3.

$$I_{(dc\ bus)} = I_{(motor)} * 1.73$$

The bus voltage is approximately the incoming voltage times the square root of 2.

$$V_{(dc\ bus)} = V_{(line)} * 1.41$$

The two statements above describe the drive running in a steady state. The DC Bus current is near zero with the motor stopped. There is some minimal current sent to power the CPU, display, I/O and snubbers for the IGBT's.

The DC bus current, in some conditions, is lower than the above, such as during deceleration on an overhauling load. It is during these times the DC Bus voltage rises. In some embodiments, this excess energy is switched through a resistor circuit when the DC Bus voltage gets high enough. Rather than simply controlling the DC Bus voltage through a resistor the present disclosure adds extra DC Bus capacitance 48 to hold this energy.

The present disclosure provides for this while having little impact on the power line feeding the VFD. Extra capacitors 48 require voltage monitoring that compares the Drives DC Bus voltage to that of the extra capacitor bank.

The extra capacitor bank 48 uses a pre-charge circuit. Even if it is taken directly from the Drives DC Bus, charging such a large bank 48 in the same time period as the drives DC Bus may be more than the drive can handle. There are fast acting high DC voltage rated semiconductor fuses between the added capacitors 48 and the drive 12.

There is a contactor between the added capacitors 48 and the drive 12 to isolate them in case of fault or shutdown. This contactor handles the DC current of the connection between the two at the max voltage that may be achieved. In some examples, this voltage is as high as 900 Volts.

Figure 2B:
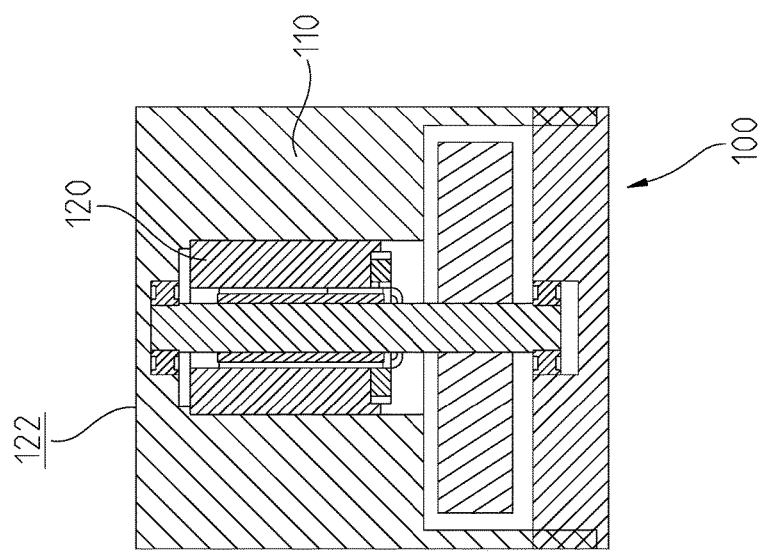
FIGS. 2A&B are illustrations of a flywheel for use with the system of FIG. 1.
Figure 2A:
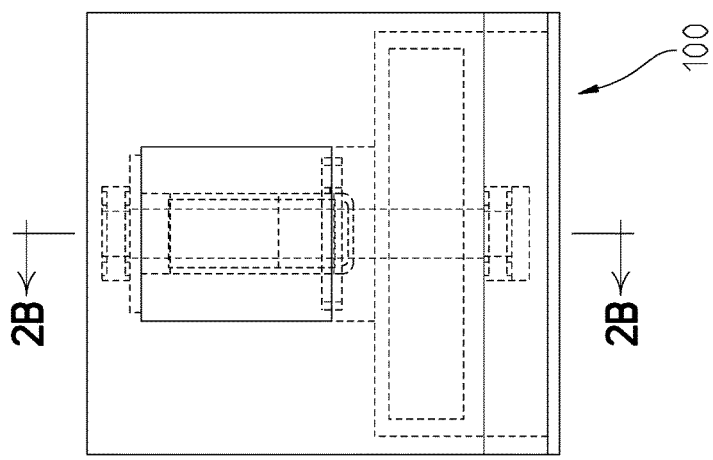

According to a second embodiment, FIG. 2, a flywheel 100 is provided to store energy released as part of the up and down movements of an elevator. The system illustratively includes: the flywheel 100, a flywheel housing 110, flywheel mechanical mountings, a flywheel drive motor 120, and a flywheel motor controller 122.

The flywheel motor controller 122 is connected to the dc bus of an existing ac variable frequency drive that controls the elevator motor. The flywheel motor controller 122 monitors the dc bus voltage and the ac line voltage continuously. As the dc bus voltage rises, the motor causes the speed of the flywheel to increase, thereby storing excess electrical energy as mechanical (Kinetic) energy.

When the elevator drive dc bus voltage drops below a predefined point, the energy stored in the flywheel is allowed to drive the motor such that current is generated and put back onto the elevator drive dc bus allowing it to use the stored energy. In the event of an AC line failure the same effect will take place, but at the same time a small inverter will allow the elevator controller to remain powered allowing the elevator car to move to a floor and open the doors so no people will be stuck within the elevator.

As previously discussed, energy from elevator movement can be harvested from an AC variable frequency drive, placed onto an AC line, and stored in an extended DC bus capacitor bank. In such a process, at least some energy is "lost" when it is converted to heat via the power semiconductors creating the AC waveform to place the energy on the AC line. Embodiments are also envisioned where the energy is harvested via the use of a permanent magnet brushless DC motor.

Operation of the system is further aided by smoothing the Pulse Width Modulated waveform on the AC line to reduce the likelihood of in harmonics and line noise occurring.

One solution for smoothing employs a line reactor. In one embodiment, this provides an inductor with a high magnetic content. These are effective since an inductor acts as a resistor to changes in current. Since the inductor is acting as a resistor, such smoothing introduces energy losses (again, such as the generation of heat).

The use of a flywheel in the elevator system increases energy efficiency and enhances energy storage. By using the energy generated by the movement of the elevator to spin the flywheel energy is preserved for future use. The motors selected to drive the flywheel are illustratively highly efficient motor such as permanent magnet (AC or brushless DC) motors driven through a drive similar in construction to the regenerative front end described above. Without the need for the reactor, the energy storage is slightly more efficient by a few percent. Over the long term such efficiency provides a considerable increase in savings. It should be appreciated that when the motor is driving movement of the flywheel it acts as a motor, and when movement of the flywheel is driving the motor, the motor is acting as a generator.

There are other considerations concerning the system efficiency. Taken as a mechanical device it is prudent to account for and try to limit friction. The use of industry standard ball bearing and grease seals introduces a fair amount of friction. It is possible today to use magnetic bearings. This allows the flywheel to float rather than ride thus reducing friction and making it more efficient. Another bearing option that would be less expensive but slightly less efficient is ceramic coated bearings.

Having the moving part (rotor) of the motor become part of the flywheel makes the system smaller and more efficient. There would only be one set of bearings to overcome.

Also considered with respect to the efficiency of the system is friction caused by air. While the outside surfaces of the flywheel can be polished to a very fine degree, the internal moving parts and supporting structure of the flywheel would meet with a air resistance. To reduce this, the flywheel motor structure is mounted within a vacuum chamber.

The kinetic energy stored in a high speed moving cylinder can be described by the two formulas below:

$E_K = \frac{1}{2} I w^2$ Where $E_K$ is the Kinetic Energy, I is the Inertia and w is the RPM.

Since we are using a cylindrical ring of a set height (length in the present case) with a clearly defined inner and outer radius, inertia is defined using the formula below:

Inertia=½$Pi*p*h(3(r2 4-r1 4)+h2(r22-r12)$ p is the Density of the material used to construct the flywheel h is the height (Length) of the flywheel r1 is the internal diameter of the flywheel cylinder r2 is the external diameter of the flywheel cylinder As a consequence of using a motor to drive the flywheel we consider that the motor will add some inertia to the system. This can be done by adding another set of equations as defined above to account for the added inertia.

Heat loss from the motor presents another issue. No motor is one hundred percent efficient. Therefore the rotor of the motor is constructed of the rare earth magnets and the stator is the electrical portion of the motor. This means the classic placement of rotor and stator would be reversed. A hollow shaft through the stator with the vacuum seals around the shaft allows for air to be moved through the shaft for heat dissipation. A fan for moving the air is only turned on when the temperature rises above a predefined set point.

The system illustratively includes: the flywheel, the flywheel housing, the flywheel mechanical mountings, the flywheel drive motor, and the flywheel motor controller.

The flywheel motor controller is connected to the dc bus of an existing ac variable frequency drive that controls the elevator motor. The flywheel motor controller monitors the dc bus voltage and the ac line voltage continuously. As the dc bus voltage rises the speed of the flywheel increases, thereby storing excess electrical energy as mechanical (Kinetic) energy. If the elevator drive dc bus voltage drops below a predefined point, the energy stored in the flywheel is put back onto the elevator drive dc bus allowing it to use the stored energy. In the event of an AC line failure the same effect will take place, but at the same time the inverter will allow the elevator controller to remain powered allowing the elevator car to move to a floor and open the doors so no people will be stuck within the elevator.

Figure 3:
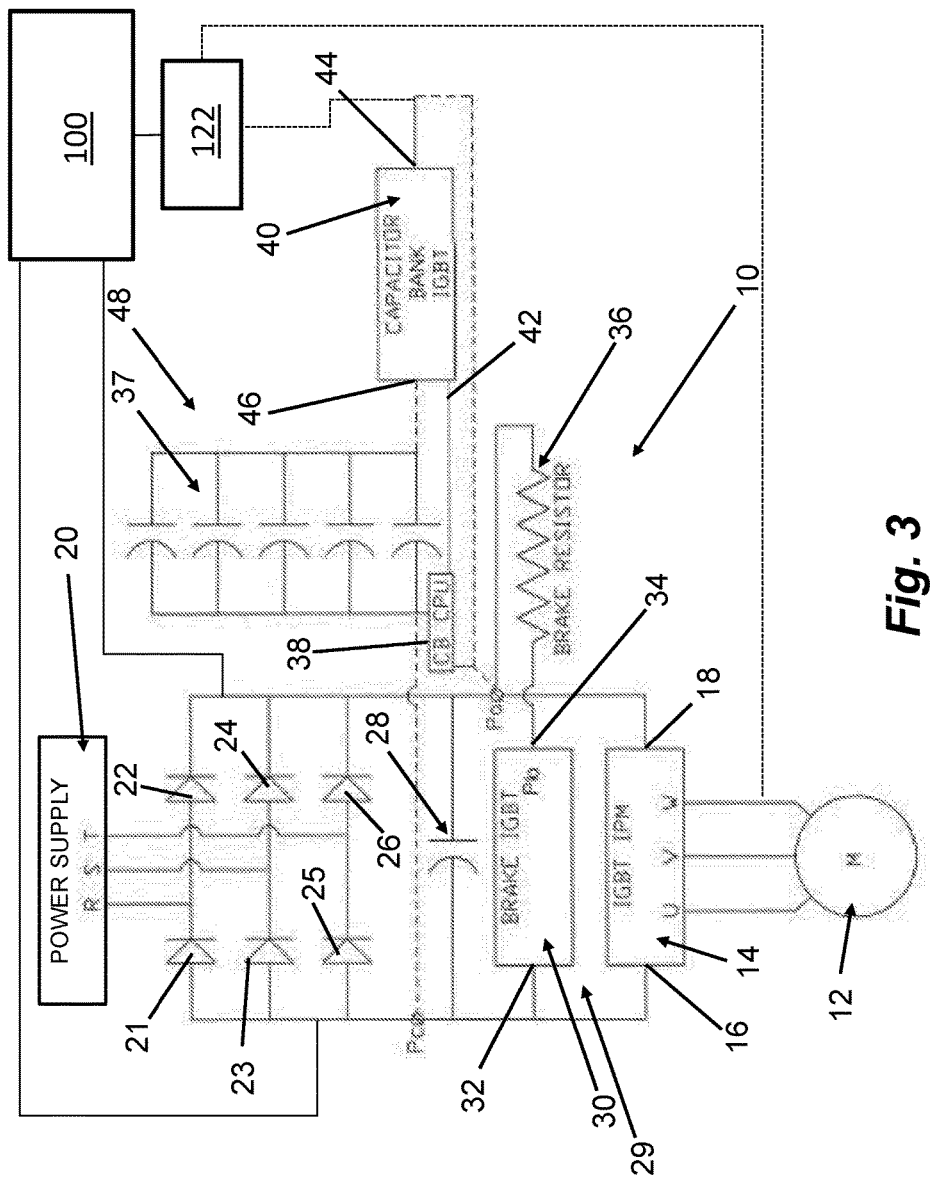
FIG. 3 is a system using a capacitor bank and a flywheel for energy management.

Still further, as shown in FIG. 3, embodiments are envisioned where both capacitor bank 48 and flywheel 100 are provided on a common system to receive from and supply power to an elevator system. Such capacitors 48 and flywheel 100 (or flywheels 100) can be provided in series or in parallel with each other.

The system components of FIG. 1 are named as follows:

| ITEM NUMBER | DESCRIPTION |
| --- | --- |
| 10 | ELEVATOR VARIABLE FREQUENCY DRIVE (VFD) WITH EXTENDED DC LINK AND BRAKE RESISTOR |
| 12 | AC MOTOR TO DRIVE ELEVATOR |
| 14 | VFD OUTPUT INSULATED GATE BIPOLAR TRANSISTOR (IGBT) INTELLIGENT POWER MODULE |
| 16 | POSITIVE DC BUS CONDUCTOR CONNECTION #1 |
| 18 | NEGATIVE DC BUS CONDUCTOR CONNECTION #1 |
| 20 | THREE PHASE AC INCOMING LINE |

| ITEM NUMBER | DESCRIPTION |
|---|---|
| 21 | D1 OF THREE PHASE SIX PULSE BRIDGE RECTIFIER |
| 22 | D2 OF THREE PHASE SIX PULSE BRIDGE RECTIFIER |
| 23 | D3 OF THREE PHASE SIX PULSE BRIDGE RECTIFIER |
| 24 | D4 OF THREE PHASE SIX PULSE BRIDGE RECTIFIER |
| 25 | D5 OF THREE PHASE SIX PULSE BRIDGE RECTIFIER |
| 26 | D6 OF THREE PHASE SIX PULSE BRIDGE RECTIFIER |
| 28 | INTERNAL DC LINK BUS OF VFD |
| 30 | INTERNAL VFD BRAKE CHOPPER IGBT |
| 32 | POSITIVE DC BUS CONDUCTOR CONNECTION #2 |
| 34 | NEGATIVE DC BUS CONDUCTOR CONNECTION #2 |
| 36 | BRAKE RESISTOR |
| 38 | EXTENDED CAPACITOR BANK CPU |
| 40 | CAPACITOR BANK IGBT |
| 42 | POSITIVE DC BUS CONDUCTOR CONNECTION FOR VOLTAGE SENSING |
| 44 | POSITIVE DC BUS CONDUCTOR CONNECTION #3 |
| 46 | CAPACITOR BANK IGBT OUTPUT CONNECTION TO CAPACITOR BANK POSITIVE TERMINAL |
| 48 | EXTENDED DC BUS LINK CAPACITOR BANK |

The above detailed description and the examples described therein have been presented for the purposes of illustration and description only and not for limitation. For example, the operations described may be done in any suitable manner. The method may be done in any suitable order still providing the described operation and results. It is therefore contemplated that the present embodiments cover any and all modifications, variations or equivalents that fall within the spirit and scope of the basic underlying principles disclosed above and claimed herein. Furthermore, while the above description describes hardware in the form of a processor executing code, hardware in the form of a state machine, or dedicated logic capable of producing the same effect are also contemplated.

The software operations described herein can be implemented in hardware such as discrete logic fixed function circuits including but not limited to state machines, field programmable gate arrays, application specific circuits or other suitable hardware. The hardware may be represented in executable code stored in non-transitory memory such as RAM, ROM or other suitable memory in hardware descriptor languages such as but not limited to RTL and VHDL or any other suitable format. The executable code when executed may cause an integrated fabrication system to fabricate an IC with the operations described herein Also, integrated circuit design systems/integrated fabrication systems (e.g., work stations including, as known in the art, one or more processors, associated memory in communication via one or more buses or other suitable interconnect and other known peripherals) are known that create wafers with integrated circuits based on executable instructions stored on a computer readable medium such as but not limited to CDROM, RAM, other forms of ROM, hard drives, distributed memory, etc. The instructions may be represented by any suitable language such as but not limited to hardware descriptor language (HDL), Verilog or other suitable language. As such, the logic, software, and circuits described herein may also be produced as integrated circuits by such systems using the computer readable medium with instructions stored therein. For example, an integrated circuit with the aforedescribed software, logic, and structure may be created using such integrated circuit fabrication systems. In such a system, the computer readable medium stores instructions executable by one or more integrated circuit design systems that causes the one or more integrated circuit design systems to produce an integrated circuit.

The invention claimed is:

1. An energy storage system including:
   an elevator;
   an elevator motor;
   a power system coupled to the elevator motor; and
   the power system including:
   at least one capacitor operable to store energy received from the elevator motor and to supply stored energy to the elevator motor;
   at least one flywheel operable to store energy received from the elevator motor and to supply stored energy to the elevator motor, the at least one flywheel electrically coupled to a DC bus, the DC bus operable to receive a voltage generated by the elevator motor; and
   a flywheel motor controller that monitors the DC bus voltage and an AC line voltage.

2. The system of claim 1, wherein the at least one capacitor includes a plurality of capacitors that are electrically coupled to the DC bus.

3. The system of claim 1, wherein upon a detection of an increase in DC bus voltage, the elevator motor causes a speed of the flywheel to increase, thereby storing electrical energy as mechanical energy.

4. The system of claim 3, wherein upon detection of the DC bus voltage dropping below a predefined point, the energy stored in the flywheel is caused to drive the elevator motor such that current is generated and put onto the DC bus thereby allowing the power system to use energy stored on the flywheel.

5. The system of claim 1, further including an inverter coupled to the power system such that in the event of an AC line failure the inverter provides an elevator controller with power.

6. The system of claim 5, wherein upon detection of an AC line failure, the system provides that elevator controller remains powered and moves an elevator car to a floor and opens elevator doors.

7. The system of claim 1, wherein the flywheel is operably coupled to a flywheel drive motor supported within a vacuum chamber of a flywheel housing.

8. The system of claim 1, further comprising a brake including a brake power module and a brake resistor coupled to the DC bus.

9. The system of claim 8, wherein the brake power module comprises a chopper Insulated Gate Bipolar Transistor ("IGBT") intelligent power module.

10. A method of operating an elevator including:
providing a power system coupled to an elevator motor operable to move an elevator having an elevator car and elevator doors; the power system including at least one capacitor and at least one flywheel;
operating the at least one capacitor and the flywheel to store energy received from the elevator motor and to supply stored energy to the elevator motor; and
monitoring voltage on a DC bus, wherein a flywheel motor controller monitors the DC bus voltage and an AC line voltage.

11. The method of claim 10, wherein upon a detection of an increase in DC bus voltage, causing the motor to increase a speed of the flywheel, thereby storing electrical energy as mechanical energy.

12. The method of claim 10, wherein upon detection of the DC bus voltage dropping below a predefined point, causing energy stored in the flywheel to drive the elevator motor such that current is generated and put onto the DC bus thereby allowing the power system to use energy stored on the flywheel.

13. The method of claim 10, wherein upon detection of an AC line failure using an inverter to provide an elevator controller with power.

14. The method of claim 13, wherein upon detection of the AC line failure, the system provides that elevator controller remains powered and moves the elevator car to a floor and opens the elevator doors.

* * * * *

UNITED STATES PATENT AND TRADEMARK OFFICE
CERTIFICATE OF CORRECTION

PATENT NO. : 10,294,070 B2
APPLICATION NO. : 15/355363
DATED : May 21, 2019
INVENTOR(S) : Harold L. Jacobs et al.

Page 1 of 1

It is certified that error appears in the above-identified patent and that said Letters Patent is hereby corrected as shown below:

On the Title Page

In Line 4 of the ABSTRACT, please change the word "form" to "from".

Signed and Sealed this
Twenty-first Day of January, 2020

Andrei Iancu
*Director of the United States Patent and Trademark Office*